US012485671B2

(12) United States Patent
Maeda

(10) Patent No.: US 12,485,671 B2
(45) Date of Patent: Dec. 2, 2025

(54) INKJET RECORDING DEVICE AND INKJET RECORDING METHOD

(71) Applicant: Hitachi Industrial Equipment Systems Co., Ltd., Tokyo (JP)

(72) Inventor: Akira Maeda, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 118 days.

(21) Appl. No.: 18/291,593

(22) PCT Filed: Jun. 27, 2022

(86) PCT No.: PCT/JP2022/025429
§ 371 (c)(1),
(2) Date: Jan. 24, 2024

(87) PCT Pub. No.: WO2023/017684
PCT Pub. Date: Feb. 16, 2023

(65) Prior Publication Data

US 2025/0091339 A1 Mar. 20, 2025

(30) Foreign Application Priority Data

Aug. 10, 2021 (JP) ................................ 2021-130470

(51) Int. Cl.
*B41J 2/115* (2006.01)
*B41J 2/02* (2006.01)
(Continued)

(52) U.S. Cl.
CPC ................. *B41J 2/115* (2013.01); *B41J 2/02* (2013.01); *B41J 2/025* (2013.01); *B41J 2/03* (2013.01);
(Continued)

(58) Field of Classification Search
CPC ..... B41J 2/115; B41J 2/02; B41J 2/025; B41J 2/03; B41J 2/035; B41J 2/085; B41J 2/09;
(Continued)

(56) References Cited

U.S. PATENT DOCUMENTS

| | | | | |
|---|---|---|---|---|
| 5,325,112 A * | 6/1994 | Muto | ......................... | B41J 2/12 347/19 |
| 7,399,068 B2 * | 7/2008 | Anagnostopoulos | ...... | B41J 2/03 347/73 |

(Continued)

FOREIGN PATENT DOCUMENTS

| | | |
|---|---|---|
| JP | H11-078059 A | 3/1999 |
| JP | 2006-224501 A | 8/2006 |

(Continued)

OTHER PUBLICATIONS

International Search Report of PCT/JP2022/025429 dated Sep. 6, 2022.

(Continued)

*Primary Examiner* — Henok D Legesse
(74) *Attorney, Agent, or Firm* — MATTINGLY & MALUR, PC

(57) ABSTRACT

An inkjet recording device automatically determines an excitation voltage of a piezoelectric element for formation of ink droplets. An excitation voltage value is applied to the piezoelectric element of a nozzle over a plurality of sweeping events. A charge voltage is applied to ink droplets generated by the applied excitation voltage value in a plurality of arbitrary printing phases to give an electric charge thereto. A charge amount given to the ink droplets is detected by a sensor to obtain a printing phase. When the relationship of a current printing phase to a previous printing phase detected for each sweeping event is reversed from an increasing side to a decreasing side and two decrease
(Continued)

determinations of the printing phase are established in succession, an excitation voltage value corresponding to the printing phase of the sweeping event immediately before the first decrease determination is set as a final excitation voltage value.

6 Claims, 8 Drawing Sheets

(51) Int. Cl.

| | |
|---|---|
| ***B41J 2/025*** | (2006.01) |
| ***B41J 2/03*** | (2006.01) |
| ***B41J 2/035*** | (2006.01) |
| ***B41J 2/085*** | (2006.01) |
| ***B41J 2/09*** | (2006.01) |
| ***B41J 2/12*** | (2006.01) |
| ***B41J 2/125*** | (2006.01) |
| ***B41J 2/18*** | (2006.01) |

(52) U.S. Cl.
CPC ............... *B41J 2/035* (2013.01); *B41J 2/085* (2013.01); *B41J 2/09* (2013.01); *B41J 2/12* (2013.01); *B41J 2/125* (2013.01); *B41J 2/18* (2013.01); *B41J 2002/022* (2013.01)

(58) Field of Classification Search
CPC ........ B41J 2002/022; B41J 2/12; B41J 2/125; B41J 2/18
See application file for complete search history.

(56) References Cited

U.S. PATENT DOCUMENTS

| | | | | |
|---|---|---|---|---|
| 2013/0249982 A1* | 9/2013 | Marcus | .................... | B41J 2/115<br>347/10 |
| 2022/0072847 A1* | 3/2022 | Watari | ..................... | B41J 2/035 |

FOREIGN PATENT DOCUMENTS

| | | |
|---|---|---|
| JP | 2007-136839 A | 6/2007 |
| JP | 2007-313808 A | 12/2007 |
| JP | 2010-017981 A | 1/2010 |
| WO | 2020/158759 A1 | 8/2020 |

OTHER PUBLICATIONS

Extended European Search Report received in corresponding European Application No. 22855748.4 dated Mar. 14, 2025.

* cited by examiner

INKJET RECORDING DEVICE AND INKJET RECORDING METHOD

TECHNICAL FIELD

The present invention relates to an inkjet recording device, and particularly to an inkjet recording device of a continuous ejection type charge control type and an inkjet recording method.

BACKGROUND ART

A general inkjet recording device of a continuous ejection type charge control type is provided with an ink container which stores ink in its main body, and supplies the ink in the ink container to a print head by an ink supply pump. The ink supplied to the print head is continuously ejected from an ink nozzle to form ink droplets. Among the ink droplets, the ink droplets used for printing are subjected to electrification and deflection processing and are caused to fly to a desired printing position on an object to be printed to form characters and symbols (hereinafter typically referred to as characters). The ink droplets not used for printing are configured to be collected by a gutter without being subjected to the electrification and deflection processing and return to the ink container by an ink recovery pump.

Then, in the inkjet recording device of a continuous ejection type charge control type, for example, as disclosed in Japanese Patent Unexamined Publication No. 2007-136839 (Patent Document 1), a piezoelectric element provided in an ink nozzle is driven by a predetermined excitation voltage value to eject ink from the ink nozzle as ink droplets.

Meanwhile, the excitation voltage value to drive the piezoelectric element of the ink nozzle affects the formation of ink droplets, and the optimum excitation voltage value is required to be set. In particular, since ink characteristics vary depending on environmental temperatures, it is important to set such an excitation voltage value as compensate for this.

For this purpose, there is known, for example, a method of, when executing printing, visually observing the ink droplets ejected from the ink nozzle with a loupe while adjusting the excitation voltage value of the piezoelectric element of the ink nozzle and determining an excitation voltage value in the case of shaping of ink droplets suitable for printing as the optimum excitation voltage value, or a method of actually printing characters while adjusting the excitation voltage value of the piezoelectric element and determining as the optimum excitation voltage value, a central value in an excitation voltage range which allows an operator to judge that good printing has been performed.

CITATION LIST

PTL 1: Japanese Unexamined Patent Application Publication No. 2007-136839

SUMMARY OF INVENTION

Technical Problem

However, in the case of the above method, the optimum excitation voltage value is determined by changing the excitation voltage value supplied to the piezoelectric element while visually observing the ink droplets ejected from the ink nozzle with the loupe or the like and repeatedly performing test printing. Further, the excitation voltage value is changed according to the "temperature-excitation voltage characteristics" provided in the inkjet recording device to thereby obtain excellent print quality corresponding to the environmental temperature.

However, in order to visually observe the ink droplets with the loupe and accurately determine the shape of the ink droplets suitable for printing, the skill of a skilled person is required, and a problem arises in that individual differences occur due to visual determination. Further, when printing is actually performed, a problem arises in that the work is made wasteful or the result of printing is visually judged by a person, thereby causing individual differences.

An object of the present invention is to provide an inkjet recording device and an inkjet recording method capable of automatically determining an excitation voltage value of a piezoelectric element suitable for forming ink droplets.

Solution to Problem

The present invention is characterized in that an inkjet recording device of a continuous ejection type charge control type, comprises: an excitation voltage circuit which applies an excitation voltage to a piezoelectric element provided in an ink nozzle that ejects ink droplets; a charging electrode which charges the ejected ink droplets; a deflection electrode that deflects a flying direction of the ink droplets charged by the charging electrode; a charge amount sensor that measures a charge amount of the ink droplets charged by the charging electrode; and a control section which controls the excitation voltage circuit, the charging electrode, the deflection electrode, and the charge amount sensor. In the inkjet recording device, the control section applies an excitation voltage value to the piezoelectric element over a plurality of sweeping events so as to sweep from a high voltage side to a low voltage side in a predetermined voltage range in a state in which the deflection electrode is de-energized; applies a charge voltage to the ink droplets generated by the applied excitation voltage value at a plurality of arbitrary printing phases to give an electric charge to the ink droplets, and detects the amount of the electric charge given to the ink droplets by the charge amount sensor to obtain an appropriate printing phase; and when the relationship of the current printing phase to the previous printing phase detected for each sweeping event is reversed from an increasing side to a decreasing side and two decrease determinations of the printing phase are established in succession, sets an excitation voltage value corresponding to a printing phase of a sweeping event immediately before the first decrease determination as a final excitation voltage value.

Further, the present invention is characterized in that, in an inkjet recording method suitable for use in an inkjet recording device of continuous ejection type charge control type including an excitation voltage circuit that applies an excitation voltage to a piezoelectric element provided in an ink nozzle that ejects ink droplets, a charging electrode that charges the ejected ink droplets, a deflection electrode that deflects a flying direction of the ink droplets charged by the charging electrode, a charge amount sensor that measures a charge amount of the ink droplets charged by the charging electrode, and a control section that controls the excitation voltage circuit, the charging electrode, the deflection electrode, and the charge amount sensor, the inkjet recording method comprises the steps of: causing the control section to apply an excitation voltage to the piezoelectric element over a plurality of sweeping events so as to sweep from a high voltage side to a low voltage side in a predetermined voltage range in a state in which the deflection electrode is de-energized; causing the control section to apply a charge voltage to the ink droplets generated by the applied excitation voltage value at a plurality of arbitrary printing phases to give an electric charge to the ink droplets and detect the amount of the electric charge given to the ink droplets by the charge amount sensor to obtain an appropriate printing phase; and causing the control section to, when the relationship of the current printing phase to the previous printing phase detected for each sweeping event is reversed from an increasing side to a decreasing side and two decrease determinations of the printing phase are established in succession, set an excitation voltage value corresponding to a printing phase of a sweeping event immediately before the first decrease determination as a final excitation voltage value.

Advantageous Effects of Invention

According to the present invention, since it is possible to automatically determine an excitation voltage value of a piezoelectric element suitable for forming ink droplets, the optimum excitation voltage value can be easily determined without the need for skill.

DESCRIPTION OF EMBODIMENTS

Hereinafter, embodiments of the present invention will be described in detail with reference to the drawings. However, the present invention is not limited to the following embodiments, and the technical concept of the present invention also includes various modifications and applications within its scope.

First, the configuration and operation of a general inkjet recording device of a continuous ejection type charge control type will be briefly described.

Figure 1:
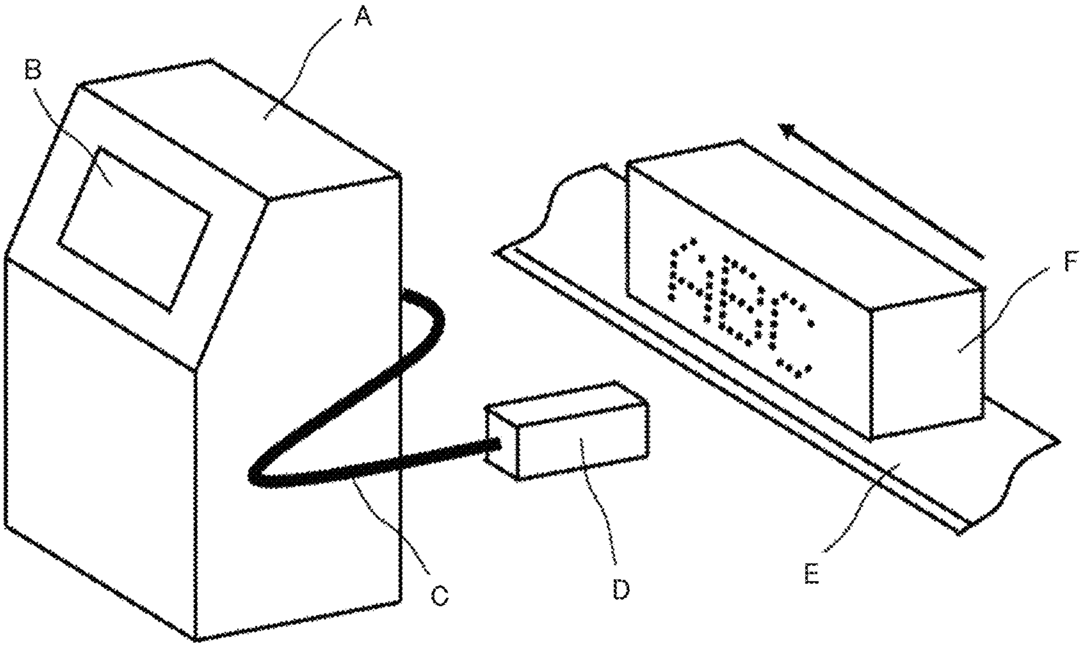
FIG. 1 is a schematic diagram describing a printing method by an inkjet recording device.

FIG. 1 illustrates an external configuration of an inkjet recording device. In FIG. 1, a main body A of the inkjet recording device is provided with a display B for display. Ink is supplied to a print head D through a cable C. Further, the determined print contents are sent to the print head D through the cable C, and ink droplets are continuously ejected based on this and thereby printed on an object to be printed F conveyed by a conveying line E such as a belt conveyer.

Figure 2:
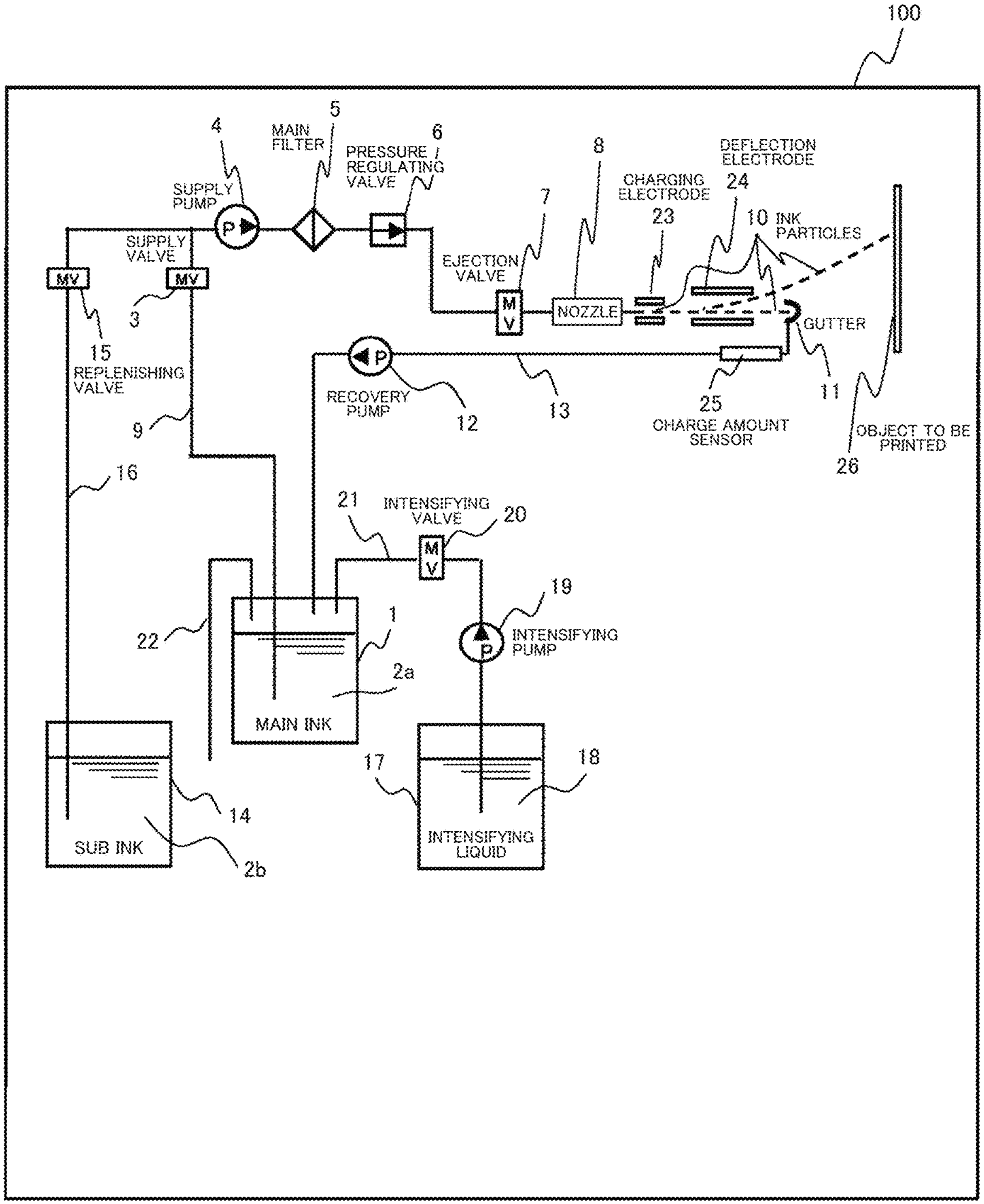
FIG. 2 is a configuration diagram showing the configuration of the inkjet recording device.

FIG. 2 typically illustrates the configuration of the inkjet recording device. In FIG. 2, the inkjet recording device 100 includes a main ink container 1. The main ink container 1 is filled with ink 2*a*. The main ink container 1 is connected to a supply valve 3, a supply pump 4, a main filter 5, a pressure regulating valve 6, an ejection valve 7, and an ink nozzle 8 through an ink supply pipe 9. A piezoelectric element (not illustrated) is provided in the ink nozzle 8 to vibrate the ink in the ink nozzle 8.

A charging electrode 23 and a deflection electrode 24 are arranged in the direction in which ink droplets 10 ejected from the ink nozzle 8 travel. The ink droplets 10 used for printing are charged with a voltage according to a character signal by the charging electrode 23. The charged ink droplets 10 fly in an electric field generated by the deflection electrode 24 and are deflected according to a charged amount thereof, and then reach an object to be printed 26 to form characters, symbols, and the like.

A gutter 11 for recovering the ink droplets 10 not used for printing is arranged in the traveling direction of the ink droplets 10 not used for printing among the ink droplets 10 ejected from the ink nozzle 8. The gutter 11 is connected, via an ink recovery pipe 13, to a charge amount sensor 25 for measuring the charge amount of the charged ink droplets 10, a recovery pump 12, and the main ink container 1.

When recovering the ink droplets 10 by the gutter 11, surrounding air of the ink droplets 10 is also taken together with the ink droplets 10 and conveyed to the main ink container 1. The air conveyed to the main ink container 1 is discharged to the outside of the inkjet recording device 100 from an exhaust port (not illustrated) provided in the inkjet recording device 100 through an external exhaust pipe 22 connected to the main ink container 1.

Further, the inkjet recording device 100 is provided with a sub-ink container 14. The sub-ink container 14 is filled with ink 2*b*. The sub-ink container 14 is connected to the supply valve 3 and the supply pump 4 via an ink supply pipe 16.

In addition, the inkjet recording device 100 is provided with an intensifying liquid container 17. The intensifying liquid container 17 is replenished with an intensifying liquid 18. The intensifying liquid container 17 is connected to an intensifying pump 19 and an intensifying valve 20 through an intensifying liquid replenishing pipe 21.

Figure 3:
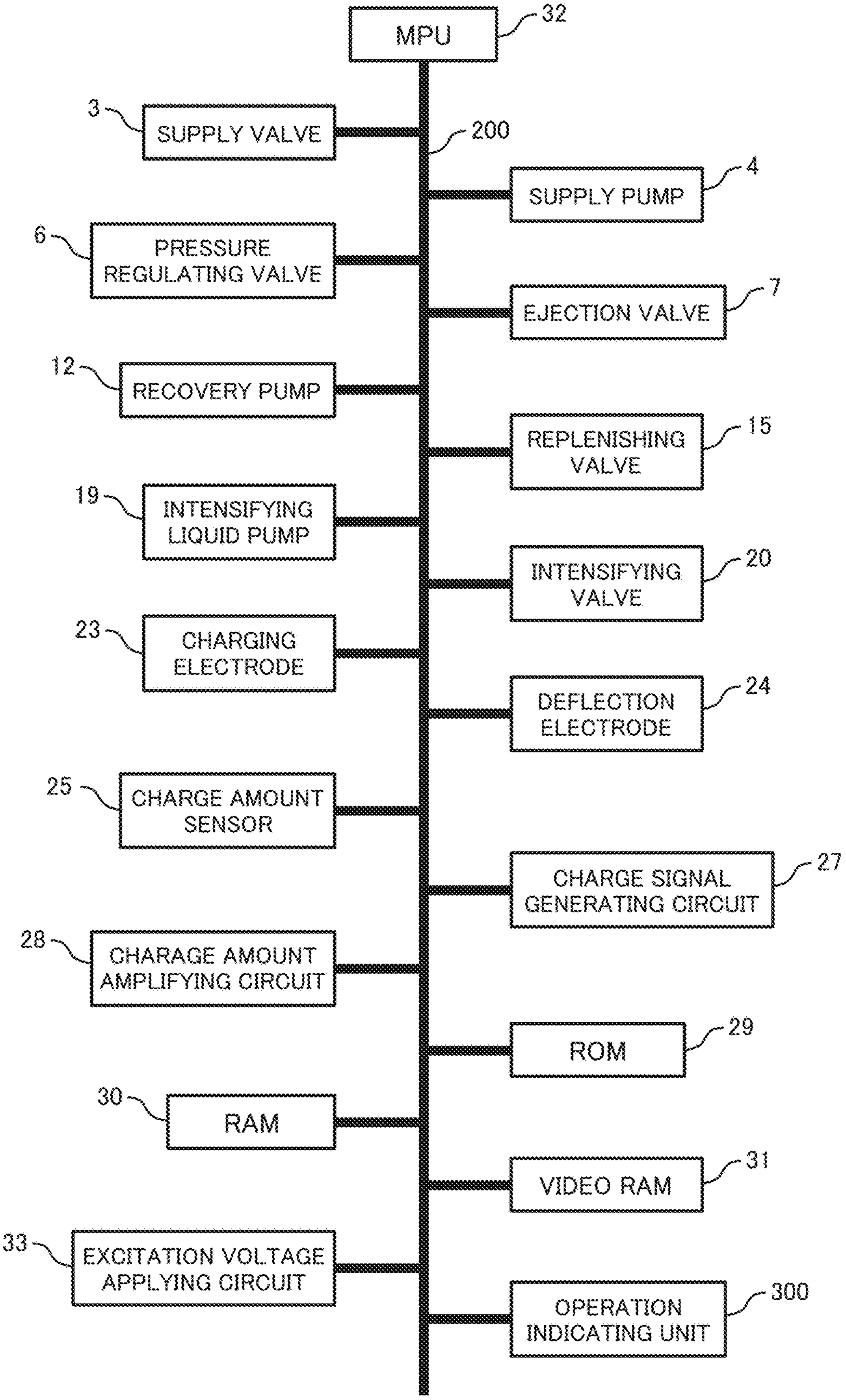
FIG. 3 is a block diagram showing a control section which controls components of the inkjet recording device.

As illustrated in FIG. 3, the inkjet recording device 100 is provided with an MPU 32 (MicroProcessing Unit) which functions as a control section which controls each component inside the inkjet recording device 100 via a bus 200.

A RAM 30 (Random Access Memory) which temporarily stores data in the inkjet recording device 100, a ROM 29 (Read Only Memory) which pre-stores programs and the like, a video RAM 31 which stores video data for charging the ink droplets 10, a charge signal generating circuit 27 which converts the video data into a charge signal, a charge amount sensor 25, a charge amount amplifying circuit 28 which amplifies a signal of the charge amount sensor 25, and an excitation voltage applying circuit 33 for exciting and driving the ink nozzle 8 are connected to the MPU 32 (MicroProcessing Unit), and the MPU 32 controls these circuits and the like.

Further, the supply valve 3, the nozzle 8, the supply pump 4, the recovery pump 12, the intensifying liquid pump 19, the supply valve 3, the pressure regulating valve 6, the ejection valve 7, the replenishing valve 15, the intensifying valve 20, the charging electrode 23, the deflection electrode 24, and an operation indicating unit 300 are connected to the MPU 32 (MicroProcessing Unit) via the bus 200, and the MPU 32 controls these operations.

Next, description will be made about the operation when performing printing. Upon performing the printing, the supply pump 4, the recovery pump 12, and the intensifying liquid pump 19 are respectively operated in response to signals input from the operation indicating unit 300, and the supply valve 3 and the ejection valve 7 are opened to be pressure-regulated to arbitrary pressure by the pressure regulating valve 6.

Then, the excitation voltage applying circuit 33 applies an excitation voltage to the piezoelectric element of the ink nozzle 8, and ink is ejected from the ink nozzle 8. Then, a charge voltage is applied to the ink droplets 10 ejected from the ink nozzle 8 at the charging electrode 23 from the charge signal generating circuit 27, and the ink droplets 10 are charged by the charging electrode 23.

The flying direction of the charged ink droplets 10 is deflected by the electric field generated by the deflection electrode 24, and the ink droplets 10 land on the object to be printed 26 for printing. The ink droplets 10 which are not used for printing fly in the direction of the gutter 11. The ink droplets 10 captured by the gutter 11 are sucked by the recovery pump 12 and recovered in the main ink container 1 through the recovery pipe 13.

Then, when the piezoelectric element of the ink nozzle 8 is vibrated by the application of the excitation voltage, the ink is formed into liquid droplets by the pressure pulsation of the ink in the ink nozzle 8 and the surface tension of the ejected ink. Here, the shape of the ink droplets 10 is affected by the magnitude of the excitation voltage value and affects print quality. Further, an excitation voltage range as a proper range in which the print quality is ensured exists in the excitation voltage value.

Figure 4:
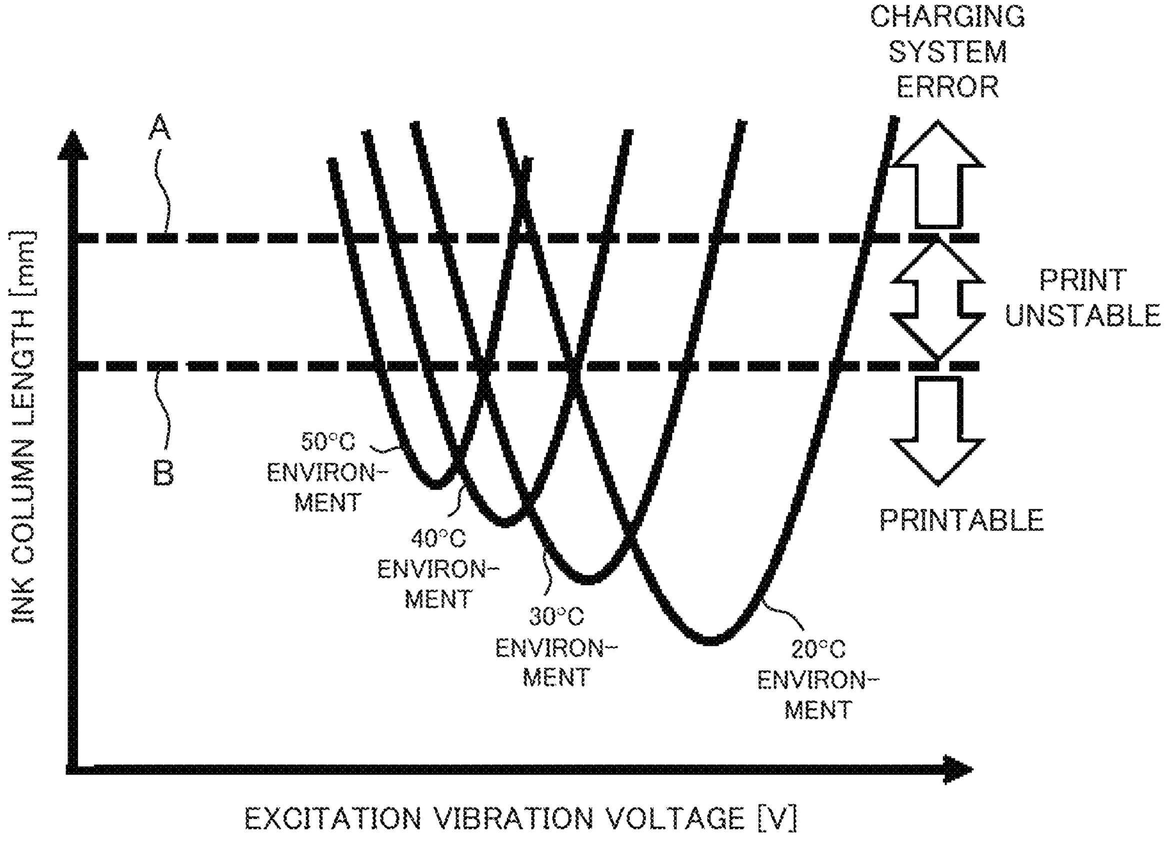
FIG. 4 is an explanatory diagram describing the influence of environmental temperatures on an excitation voltage of a piezoelectric element of an ink nozzle and on an ink column length.

FIG. 4 illustrates changes in the excitation voltage/ink column length characteristics for each environmental temperature with the excitation voltage (represented as an excitation vibration voltage in the figure) taken on the horizontal axis and the ink column length taken on the vertical axis as parameters. As the ink column length becomes longer, the print quality tends to deteriorate. A broken line A indicates a charging system error resulting in poor print quality. The print quality becomes unstable between the broken line A and a broken line B. Therefore, it can be seen that when the ink column length becomes shorter than the broken line B, the print quality is ensured.

Thus, the excitation voltage value is set within a range in which the ink column length is shorter than the broken line B. However, when the environmental temperature changes, the excitation voltage/ink column length characteristics vary, and the excitation voltage range also fluctuate correspondingly. As can be seen from FIG. 4, characteristics changes such as the higher the ambient temperature, the longer the ink column length, the narrower the excitation voltage range, and the lower the excitation voltage value occur.

Therefore, it is difficult for an operator to appropriately set the excitation voltage value. In order to accurately determine the shape of ink droplets suitable for printing, the skill of an expert to visually observe and judge the ink droplets with a loupe is required. Further, there is a problem that individual differences occur because of visual judgement. Therefore, there is a need for an inkjet recording device capable of automatically determining an excitation voltage value for a piezoelectric element suitable for formation of ink droplets.

Then, from the results of various experiments and simulations, the inventors of the present invention have found that the excitation voltage value for obtaining appropriate ink droplets is on the lower voltage side than the excitation voltage value at which the ink column length becomes the shortest and may be set to an excitation voltage value close to the excitation voltage value at which the ink column length becomes the shortest, and also have found a specific method for this purpose. Consequently, it is possible to automatically set an appropriate excitation voltage value without visually judging the result of printing and without relying on the skill of the expert.

Figure 5:
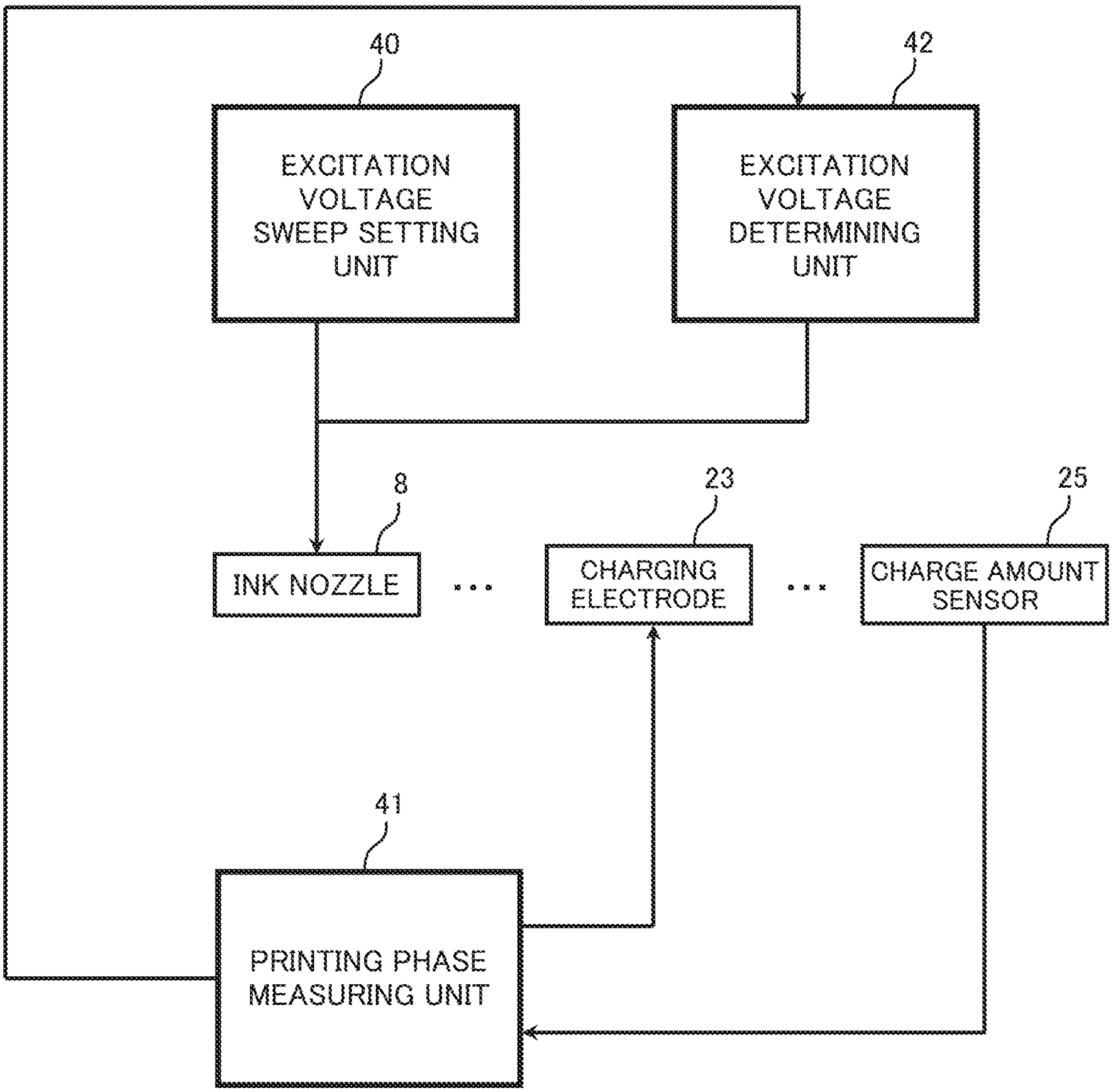
FIG. 5 is a block diagram showing essential parts of a control section of an inkjet recording device according to an embodiment of the present invention.

Hereinafter, specific embodiments of the present invention will be described based on the drawings. FIG. 5 illustrates an excitation voltage automatic setting function section according to the present embodiment, which automatically sets an excitation voltage value. The present excitation voltage automatic setting function section is configured by a control program executed by the MPU 32 (MicroProcessing Unit).

In FIG. 5, an excitation voltage sweep setting unit 40 has a function of applying an excitation voltage value to the piezoelectric element of the ink nozzle 8 in a de-energized state of the deflection electrode 24 over a plurality of sweeping events so as to sweep from the high voltage side to the low voltage side in a predetermined voltage range.

Also, a printing phase measuring unit 41 has a function of applying charge voltages at arbitrary plural phases from the charging electrode 23 to the ink droplets generated at the applied excitation voltage value to thereby give electric charge to the ink droplets and detecting the amount of the electric charge given to the ink droplets by the charge amount sensor 25 to obtain an appropriate printing phase.

Further, an excitation voltage determining unit 42 has a function of, when the relationship of the current printing phase to the previous printing phase detected by the printing phase measuring unit 41 for each sweeping event is reversed from the increase side to the decrease side, and a decrease determination of the printing phase is established twice in a row, determining an excitation voltage value corresponding to the printing phase of the sweeping event immediately before the first decrease determination as a final excitation voltage value.

Next, the specific functions of the excitation voltage sweep setting unit 40, the printing phase measuring unit 41, and the excitation voltage determining unit 42 will be described using FIG. 6. Here, the horizontal axis of FIG. 6 indicates the excitation voltage set value and the number of sweeps therefor. Further, the vertical axis indicates the printing phase at each excitation voltage set value. Incidentally, as will be described later, the printing phase illustrated in FIG. 6 corresponds to phases obtained by dividing one period of the excitation frequency of the piezoelectric element into 16 equal parts.

The excitation voltage sweep setting unit 40 sets the number of sweeps of the excitation voltage applied to the piezoelectric element provided in the ink nozzle 8 and the excitation voltage set value. In the present embodiment, sweeping is repeated 20 times (N=0 to 19) continuously with an excitation time (for example, 100 ms) having a predetermined length of time for each sweep, and the sweeping is performed while changing the excitation voltage set value (Vn) in each sweeping event.

Incidentally, although a difference (ΔV) between the excitation voltage set values of adjacent sweeping events is arbitrary, the difference (ΔV) is set to about 2 [V] to 4 [V].

Therefore, the excitation voltage set value "Vn" will increase by the difference (ΔV) from the low voltage side to the high voltage side.

The printing phase measuring unit 41 measures the printing phase in each sweeping event. As is well known, the printing phase can be determined by the charge amount sensor 25. In the present embodiment, in order to detect a separation timing (printing phase) of ink droplets, as shown on the vertical axis of FIG. 6, during non-printing, the phase in which the period of the excitation frequency is divided into 16 equal parts (M=0 to 15), and in synchronism with the divided phases, a phase search voltage (pulse voltage) in which the charge timing for charging the ink droplets is changed is generated to charge the ink droplets.

Then, the charge amount sensor 25 detects the charge amount of the ink droplets charged for each phase and compares the detected charge amount with a predetermined threshold value to determine the phase in which normal charging can be performed, as the printing phase.

Incidentally, the phase in which the normal charging can be performed are normally generated continuously in plural form, but a representative phase among them may be selected. Generally, the central printing phase of a plurality of consecutive printing phases is selected.

Figure 6:
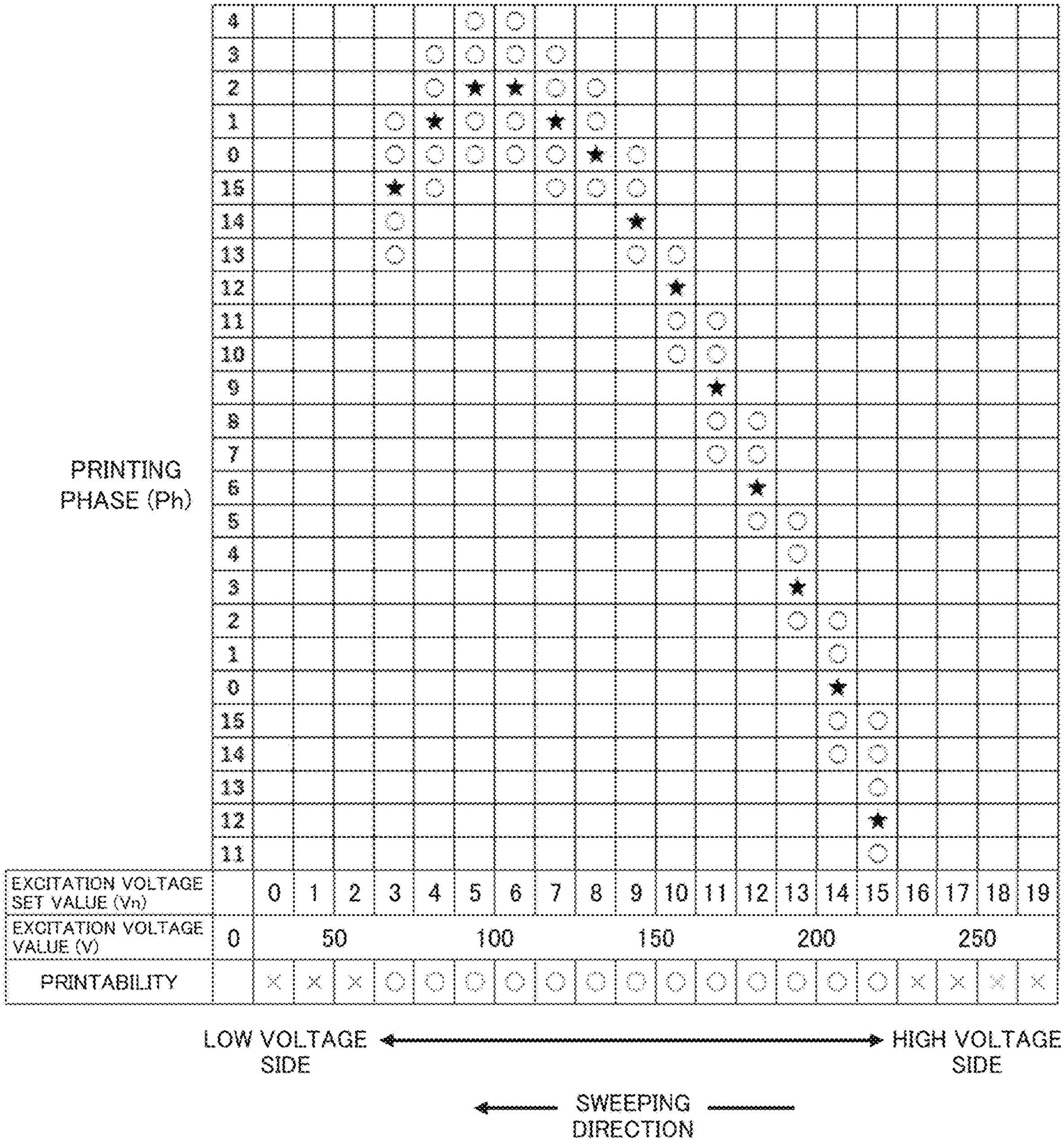
FIG. 6 is an explanatory diagram describing the relationship between an excitation voltage applied to the piezoelectric element of the ink nozzle and a printing phase.

For example, in FIG. 6, when the excitation voltage set value (Vn) is "$V_{15}$", the printing phases "$Ph_{11}$ to $Ph_{15}$" indicated by "○" are phases in which charging can be normally performed. Then, among the printing phases "$Ph_{11}$ to $Ph_{15}$", the printing phase "$Ph_{12}$" indicated by "* (asterisk)" is determined as the selected representative printing phase.

Similarly, when the excitation voltage set value (Vn) is "$V_{11}$", the printing phases "$Ph_7$ to $Ph_{11}$" indicated by "o" are phases in which charging can be normally performed. Then, among the printing phases "$Ph_7$ to $Ph_{11}$", the printing phase "$Ph_9$" indicated by "* (asterisk)" is determined as the selected representative printing phase. The same also applies to the printing phases of the respective excitation voltage set values (Vn) below.

Therefore, the characteristics of the excitation voltage set value and the representative printing phase become the characteristics indicated by "* (asterisk)", and this relationship exhibits the same tendency even if the environmental temperature changes. Incidentally, the characteristics are characteristics within the printing phase divided into the 16 equal parts.

Further, finally, as indicated by printability "○, ×" on the horizontal axis of FIG. 6, as the excitation voltage set value (Vn), the excitation voltage set values "$V_3$ to $V_{15}$" become a printable excitation voltage range. Next, it is necessary to determine the optimum excitation voltage set value (Vop) from within the excitation voltage range. This is determined by the excitation voltage determining unit 42.

As described above, from the results of various experiments and simulations, the inventors of the present invention have found that the excitation voltage value for obtaining appropriate ink droplets may be set to an excitation voltage value close to the excitation voltage value at which the ink column length becomes the shortest, on the lower voltage side than the excitation voltage value at which the ink column length becomes the shortest.

Then, it was obtained as the findings that the excitation voltage value close to the excitation voltage value at which the ink column length became the shortest was desirably the excitation voltage value immediately after the direction of increase/decrease in the value of the printing phase of each adjacent sweeping event was reversed from the increasing side to the decreasing side.

Therefore, in FIG. 6, the direction of increase/decrease in the value of the printing phase is on the lower voltage side than the excitation voltage value at which the direction of increase/decrease in the value of the printing phase is reversed from the increasing side to the decreasing side, and the excitation voltage set value "$V_5$" close to the excitation voltage value at which the direction of increase/decrease in the value of the printing phase is reversed, is determined as the optimum excitation voltage value. Hereinafter, description will be made about a method of determining the excitation voltage set value "$V_5$".

The printing phase measuring unit 41 detects an appropriate representative printing phase for each sweeping event. A result measured by the printing phase measuring unit 41 is input to the excitation voltage determining unit 42. Here, when the representative printing phase is detected for each sweeping event, sweeping is performed from the high voltage side to the low voltage side. That is, the representative printing phases are detected in the order of excitation voltage set values "$V_{19}$", "$V_{18}$", "$V_{17}$", . . . , "$V_2$", "$V_1$", and "$V_0$".

This is because the optimum excitation voltage value exists on the lower voltage side than the excitation voltage value at which the direction of increase/decrease in the value of the printing phase at which the ink column length becomes the shortest is reversed. Therefore, when sweeping the excitation voltage, it is based on the fact that it is better to detect the printing phase from the high voltage side to the low voltage side in which the reversal of the direction of increase/decrease in the value of the printing phase can be quickly determined.

This is because a problem arises in that if sweeping is performed from the low voltage side to the high voltage side, the optimum excitation voltage set value on the low voltage side must be determined after exceeding the reversal of the direction of increase/decrease in the value of the printing phase, and rule creation for control programs becomes complicated. However, the optimum excitation voltage value can be determined even if sweeping is performed from the low voltage side to the high voltage side.

Figure 7:
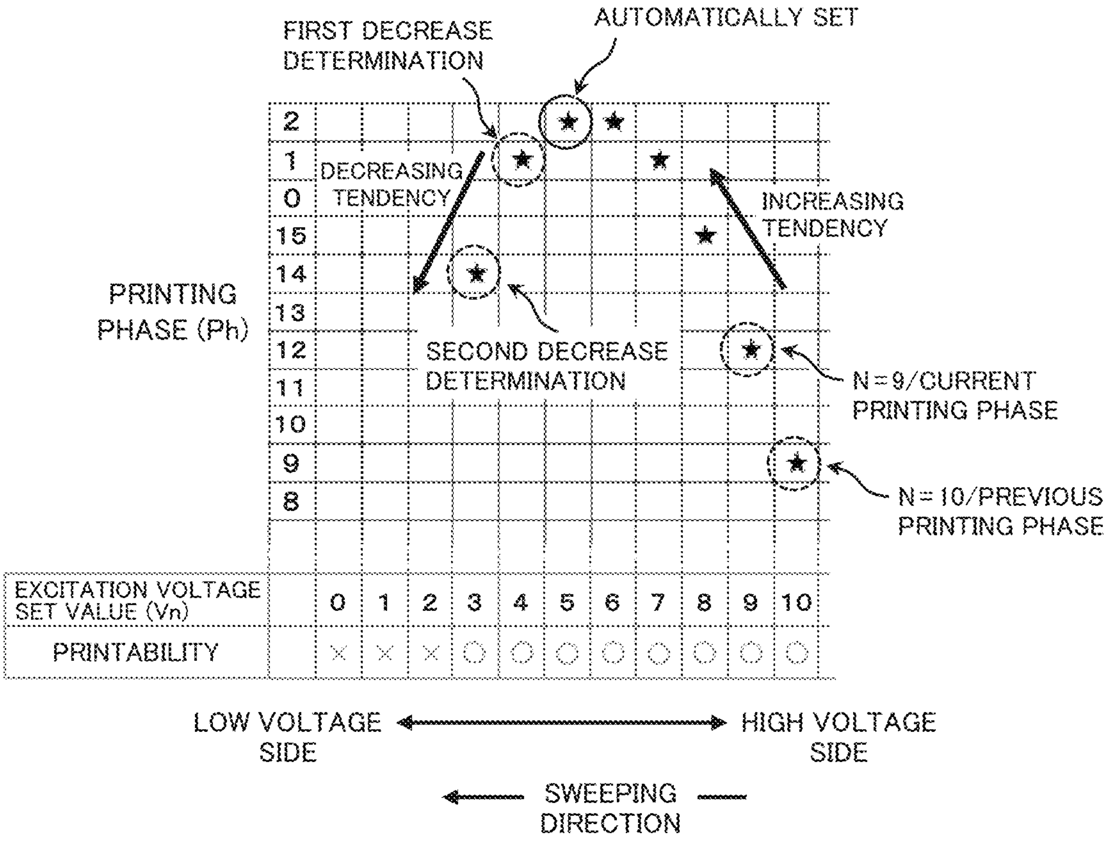
FIG. 7 is an explanatory diagram for obtaining a final excitation voltage value.

Then, the excitation voltage determining unit 42 determines the change direction (increase/decrease direction) of the measured printing phase and detects the reversal of increase/decrease in the value of the printing phase. In FIG. 7 (an example different from FIG. 6), it shows that, for example, the increase in the value of the printing phase can be determined from the difference ($\Delta Ph = Ph_9 - Ph_{12}$) between the printing phase "$Ph_9$" in the previous sweeping event (N=10) and the printing phase "$Ph_{12}$" in the adjacent current sweeping event (N=9), and the increase/decrease direction of the printing phase approaches a reversal region.

Conversely, for example, it can be determined from the difference ($\Delta Ph = Ph_1 - Ph_{14}$) between the printing phase "$Ph_1$" in the previous sweeping event (N=4) and the printing phase "$Ph_{14}$" in the adjacent current sweeping event (N=3) that the value of the printing phase is decreasing. It is shown that the increase/decrease direction of the printing phase goes away from the reversal region.

Then, after the direction of increase/decrease in the value of the printing phase is reversed, the printing phase "$Ph_{14}$" in the current sweeping event (N=3) has been determined to decrease twice consecutively. Therefore, for the printing phase "$Ph_1$" in the first sweeping event (N=4) determined to be decreasing, the excitation voltage set value "$V_5$" in the previous sweeping event (N=5) is finally determined as the optimum excitation voltage set value "Vop").

Incidentally, depending on conditions such as the type of ink and ink viscosity, the excitation voltage value has an allowable range. As the allowable range, it is also possible to automatically set not only the excitation voltage value immediately before the first excitation voltage value determined to have decreased, but also the excitation voltage value between two previous and two subsequent excitation voltage values.

Figure 8:
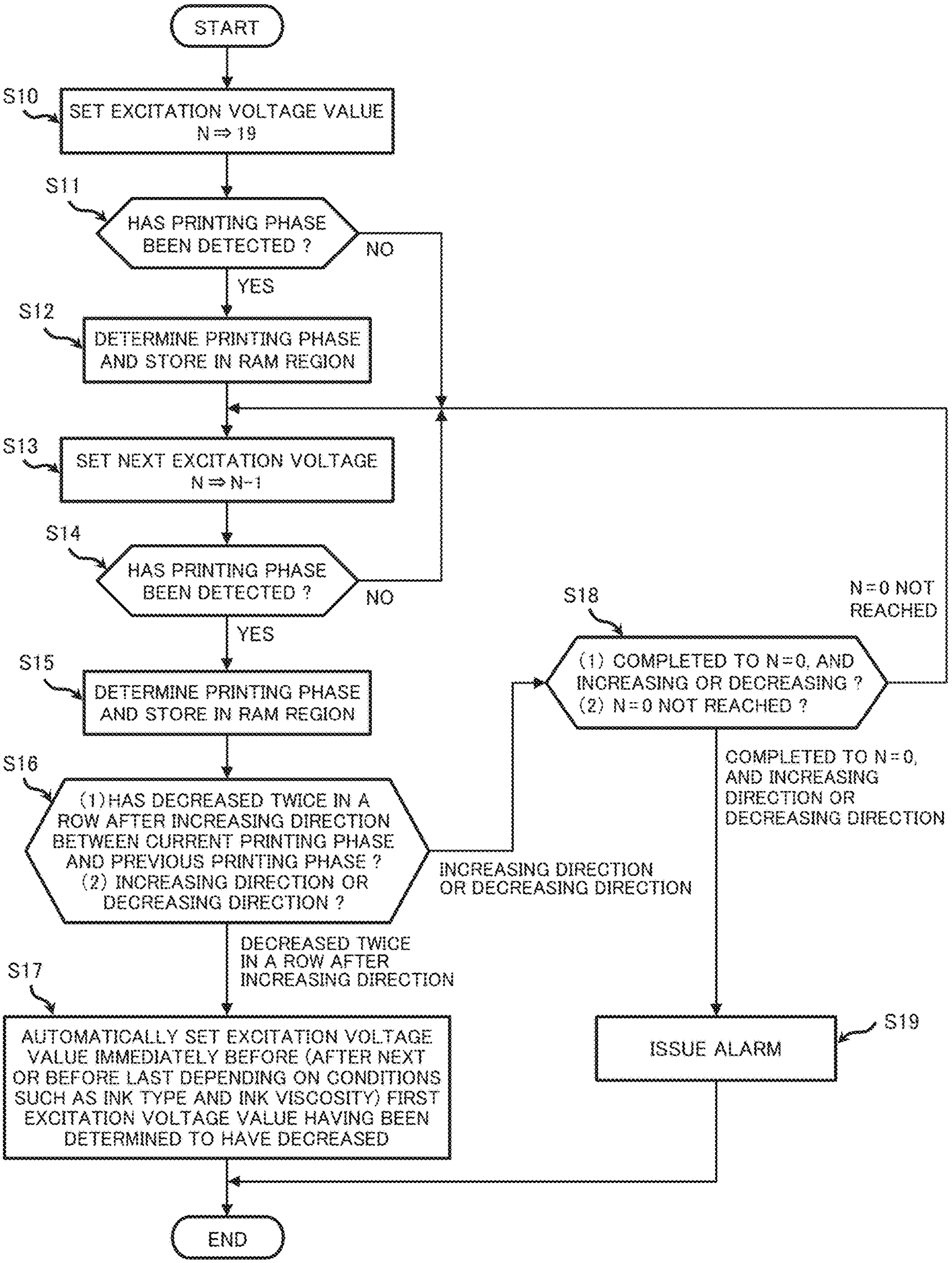
FIG. 8 is a processing flowchart for describing the processing of the block diagram illustrated in FIG. 5.

Next, a processing flow when the operation of the excitation voltage automatic setting function section illustrated in FIG. 5 is executed by the MPU 32 (Micro Processing Unit) will be briefly described based on FIG. 8. This processing flow describes the concept of the operation of the excitation voltage automatic setting function section.

Incidentally, in the following, the voltage of the deflection electrode 24 is set to 0 [V] so that the ink droplets are not deflected. This is to prevent the occurrence of a state in which the charged ink droplets 10 are not recovered into the gutter 11 during a period from when an electric charge is applied to the ink droplets 10 until the ink droplets 10 enter the gutter 11.

<<Step S10>>

In Step S10, the excitation voltage set value "$V_{19}$" is set as the first sweeping event (N=19) from the high voltage side. The excitation voltage set value "$V_{19}$" is applied to the piezoelectric element of the ink nozzle 8 to vibrate the piezoelectric element. The processing flow proceeds to Step S11 after setting the excitation voltage set value "$V_{19}$".

<<Step S11>>

In Step S11, the ink droplets are charged in plural printing phases obtained by equally dividing the excitation frequency by 16, and the charge amount of the charged ink droplets is compared with a threshold value to determine whether or not the printing phase has been detected. This determination is as described above. When the printing phased is detected, the processing flow proceeds to Step S12. On the other hand, when the printing phase is not detected, it is determined that good printing cannot be carried out, and the processing flow proceeds to Step S13 so as to execute the next sweeping event.

<<Step S12>>

In Step S12, the value of a representative printing phase, which is a central value is determined from a plurality of detected printing phases and stored in a RAM area. When the processing of detecting the printing phase ends in the first sweeping event, the processing flow proceeds to Step S13.

<<Step S13>>

In Step S13, the excitation voltage set value "$V_{18}$" is set as the second sweeping event (N=18). This excitation voltage set value "$V_{18}$" is similarly applied to the piezoelectric element of the ink nozzle 8 to vibrate the piezoelectric element. After the excitation voltage set value "$V_{18}$" is set, the processing flow proceeds to Step S14.

<<Step S14>>

Also in Step S14, the ink droplets are charged in plural printing phases obtained by equally dividing the excitation frequency by 16, and the charge amount of the charged ink droplets is compared with a threshold value to determine whether or not the printing phase has been detected. This determination is also as described above. When the printing phased is detected, the processing flow proceeds to Step S15. On the other hand, when the printing phase is not detected, it is determined that good printing cannot be carried out, and the processing flow proceeds to Step S13 so as to execute the next sweeping event. In Step S13, the same processing is executed below while increasing the number of sweeps.

<<Step S15>>

Also in Step S15, the value of a representative printing phase, which is a central value is determined from a plurality of detected printing phases and stored in the RAM area. When the processing of detecting the printing phase is completed in the second sweeping event, the processing flow proceeds to Step S16.

<<Step S16>>

In Step S16, it is determined based on the value of the previous printing phase store in the RAM area and the value of the current printing phase also stored in the RAM area (1) whether the value of the printing phase is in an increasing direction or in a decreasing direction, and further (2) whether it is decreasing twice in succession after the increasing direction (decrease determination). This determination is as described above.

Then, (1) when it is determined that the value of the printing phase is in the increasing direction or in the decreasing direction, the processing flow proceeds to Step S18. (2) When it is determined that the value thereof is decreasing twice in succession after the increasing direction, the processing flow proceeds to Step S17.

<<Step S17>>

In Step S17, since it is determined that the value of the printing phase is decreasing twice in succession after the direction of increase/decrease in the value of the printing phase is reversed, the excitation voltage set value in the immediately preceding sweeping event is finally determined as the optimum excitation voltage set value "Vop" with respect to the printing phase in the first sweeping event determined to have decreased. Then, the processing flow exits to the end.

Incidentally, as described above, depending on conditions such as the type of ink and ink viscosity, the excitation voltage value has an allowable range. As the allowable range, it is also possible to automatically set not only the excitation voltage value immediately before the first excitation voltage value determined to have decreased, but also the excitation voltage value between two previous and two subsequent excitation voltage values.

Here, once the optimum excitation voltage set value "Vop" is obtained, subsequent sweeping is not performed, so that an unnecessary sweeping time can be omitted and fast operation can be carried out.

<<Step S18>>

In Step S18, it is determined whether (1) the sweeping event has been completed to N=0, and the direction of increase/decrease in the value of the printing phase has not been reversed and is still increasing or decreasing, or (2) the sweeping event has not reached N=0.

(2) When it is determined that the sweeping event has not reached N=0, the processing flow proceeds to Step S13, where the next sweeping is executed for the current sweeping event. On the other hand, (1) when it is determined that the sweeping event has been competed up to N=0, and the direction of increase/decrease in the value of the printing phase has not been reversed and is still increasing or decreasing, the processing flow proceeds to Step S19.

<<Step S19>>

In Step S19, since it is determined that the sweeping event has been completed to N=0, and the direction of increase/decrease in the value of the printing phase has not been reversed and is still increasing or decreasing, this is considered to indicate that an abnormality has occurred, an alarm is issued, and then the processing flow exits to the end. Incidentally, when the alarm is issued, inspection is conducted by a worker.

As described above, the present invention is characterized in that the excitation voltage value is applied to the piezoelectric element over the plural sweeping events so as to sweep from the high voltage side to the low voltage side in the predetermined voltage range in the state in which the deflection electrode is not energized, the charge voltage is applied to the ink droplets generated by the applied excitation voltage value in the plurality of arbitrary printing phases to give the electric charge thereto, the amount of the electric charge applied to the ink droplets is detected by the charge amount sensor to determine the printing phase, and when the relationship of the current printing phase to the previous printing phase detected for each sweeping event is reversed from the increasing side to the decreasing side and the two decrease determinations of the printing phase are established in succession, the excitation voltage value corresponding to the printing phase of the sweeping event immediately before the first decrease determination is set as the final excitation voltage value.

According to this, since the excitation voltage value of the piezoelectric element suitable for formation of the ink droplets can be automatically determined, it is possible to easily determine the optimum excitation voltage value without requiring skill.

Note, the present invention is not limited to the several embodiments described above and includes various modifications. The above embodiments have been described in detail to explain the present invention in an easy-to-understand manner, and are not necessarily limited to those having all the described configurations. Further, it is possible to replace a part of the configuration of one embodiment with the configuration of another embodiment. It is also possible to add the configuration of another embodiment to the configuration of one embodiment. It is also possible to add, delete, and replace other configurations with respect to the configuration of each embodiment.

REFERENCE SIGNS LIST

1: main ink container, 2: ink, 3: supply valve, 4: supply pump, 5: main filter, 6: pressure regulating valve, 7: ejection valve, 8: nozzle, 9: supply pipe, 10: ink droplets, 11: gutter, 12: recovery pump, 13: recovery pipe, 14: sub-ink container, 15: replenishing valve, 16: replenishing pipe, 17: intensifying liquid container, 18: intensifying liquid, 19: intensifying liquid pump, 20: intensifying valve, 21: intensifying liquid replenishing pipe, 22: exhaust tube, 23: charging electrode, 24: deflection electrode, 25: charge amount sensor, 26: object to be printed, 27: charge signal generating circuit, 28: charge amount amplifying circuit, 29: ROM, 30: RAM, 31: video RAM, 32: MPU, 33: excitation voltage applying circuit, 100: inkjet recording device, 200: bus

The invention claimed is:

1. An inkjet recording device of a continuous ejection type charge control type, comprising: an excitation voltage circuit which applies an excitation voltage to a piezoelectric element provided in an ink nozzle that ejects ink droplets; a charging electrode which charges the ejected ink droplets; a deflection electrode that deflects a flying direction of the ink droplets charged by the charging electrode; a charge amount sensor that measures a charge amount of the ink droplets charged by the charging electrode; and a control section which controls the excitation voltage circuit, the charging electrode, the deflection electrode, and the charge amount sensor, wherein the control section includes:

an excitation voltage sweep setting unit that applies an excitation voltage value to the piezoelectric element over a plurality of sweeping events so as to sweep from a high voltage side to a low voltage side in a predetermined voltage range in a state in which the deflection electrode is de-energized;

a printing phase measuring unit that applies a charge voltage to the ink droplets generated by the applied excitation voltage value at a plurality of arbitrary printing phases to give an electric charge to the ink droplets, and detects the amount of the electric charge given to the ink droplets by the charge amount sensor to obtain an appropriate printing phase; and an excitation voltage determining unit that, when the relationship of the current printing phase to the previous printing phase detected for each sweeping event is reversed from an increasing side to a decreasing side and two decrease determinations of the printing phase are established in succession, sets an excitation voltage value corresponding to a printing phase of a sweeping event between two sweeping events before the first decrease determination and two sweeping events after the first decrease determination as a final excitation voltage value.

2. The inkjet recording device according to claim 1, wherein the excitation voltage determining unit determines an excitation voltage value corresponding to a printing phase of a sweeping event immediately before the first decrease determination as a final excitation voltage value.

3. The inkjet recording device according to claim 2, wherein when the final excitation voltage value is determined by the excitation voltage determining unit, the control section does not execute sweeping by the excitation voltage sweep setting unit.

4. The inkjet recording device according to claim 2, wherein when it is determined by the excitation voltage determining unit that in all sweeping events, the relationship of the current printing phase to the previous printing phase is reversed from the increasing side to the decreasing side, and the two decrease determinations of the printing phase are not established in succession, the control section issues an alarm.

5. An inkjet recording method suitable for use in an inkjet recording device of continuous ejection type charge control type including an excitation voltage circuit that applies an excitation voltage to a piezoelectric element provided in an ink nozzle that ejects ink droplets, a charging electrode that charges the ejected ink droplets, a deflection electrode that deflects a flying direction of the ink droplets charged by the charging electrode, a charge amount sensor that measures a charge amount of the ink droplets charged by the charging electrode, and a control section that controls the excitation voltage circuit, the charging electrode, the deflection electrode, and the charge amount sensor, the inkjet recording method comprising the steps of:

causing the control section to apply an excitation voltage to the piezoelectric element over a plurality of sweeping events so as to sweep from a high voltage side to a low voltage side in a predetermined voltage range in a state in which the deflection electrode is de-energized;

causing the control section to apply a charge voltage to the ink droplets generated by the applied excitation voltage value at a plurality of arbitrary printing phases to give an electric charge to the ink droplets and detect the amount of the electric charge given to the ink droplets by the charge amount sensor to obtain an appropriate printing phase; and causing the control section to, when the relationship of the current printing phase to the previous printing phase detected for each sweeping event is reversed from an increasing side to a decreasing side and two decrease determinations of the printing phase are established in succession, set an excitation voltage value corresponding to a printing phase of a sweeping event between two sweeping events before and two sweeping events after the first decrease determination as a final excitation voltage value.

6. The inkjet recording method suitable for use in the inkjet recording device according to claim 5, wherein an excitation voltage value corresponding to a printing phase of a sweeping event immediately before the first decrease determination is set as a final excitation voltage value.

* * * * *